V. H. GARDNER.
END GATE FOR VEHICLE BODIES.
APPLICATION FILED JAN. 9, 1919.

1,310,334.

Patented July 15, 1919.

Inventor
V. H. Gardner
By C. H. Parker
Attorney.

UNITED STATES PATENT OFFICE.

VIRGIL H. GARDNER, OF GLENDALE, KENTUCKY.

END-GATE FOR VEHICLE-BODIES.

1,310,334.　　　　Specification of Letters Patent.　　Patented July 15, 1919.

Application filed January 9, 1919. Serial No. 270,364.

*To all whom it may concern:*

Be it known that I, VIRGIL H. GARDNER, a citizen of the United States, residing at Glendale, in the county of Hardin and State of Kentucky, have invented certain new and useful Improvements in End-Gates for Vehicle-Bodies, of which the following is a specification.

My invention relates to improvements in end gates for vehicle bodies, and has particular reference to the means for connecting the end gate with the vehicle body.

An important object of the invention is to provide means whereby the end gate may be held firmly or clamped in the upright or closed position, thereby preventing the same from working loose or rattling.

A further object of the invention is to provide means which will permit of the quick and easy removal of the end gate from the body of the vehicle, when desired.

Other objects and advantages of the invention will be apparent during the course of the following description.

Figure 1:
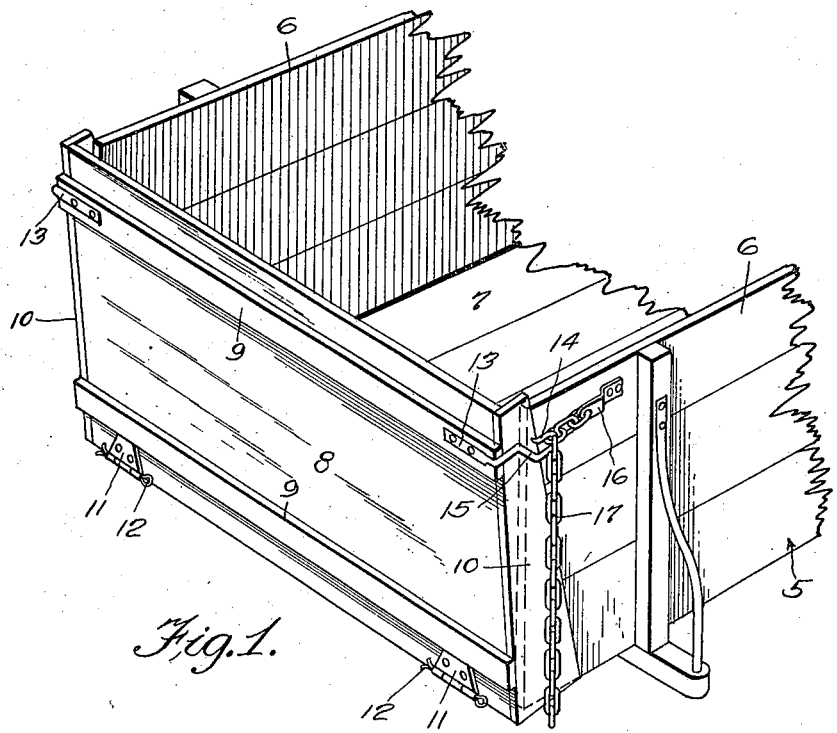
Figure 2:
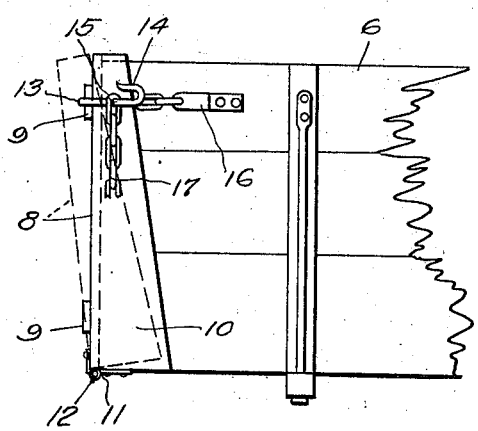
Figure 3:
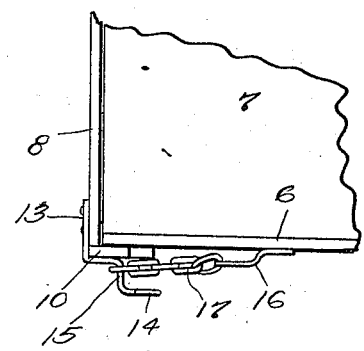

In the accompanying drawing forming a part of this specification and in which like numerals of reference are employed to designate like parts throughout the same, Figure 1 is a perspective view of an end gate embodying my invention, showing the same applied to a vehicle body;

Fig. 2 is an end elevation of the end gate showing it clamped in the closed or upright position; and Fig. 3 is a plan view of the same.

In the drawing wherein for the purpose of illustration is shown a preferred embodiment of my invention, the numeral 5 designates the body of a vehicle, such as a wagon, including side boards 6 and a floor 7.

The numeral 8 designates the end gate, preferably having longitudinal reinforcing strips 9, and transverse strips 10, secured thereto, as shown. The end gate 8 is detachably hinged to the floor 7 by strap hinges 11, the leaves of which are detachably secured together by a cotter pin 12. It is thus seen that the end gate may be readily separated from the floor 7, when desired, but it will be impossible for the leaves of the hinges to work loose.

Connected with the upper end of the end gate 8 and preferably secured to the longitudinal strip 9 are fastening members 13, provided at their ends with hooks 14. Each fastening member is provided rearwardly of the hook and spaced a substantial distance from the forward portion thereto with a tightening shoulder 15, which is preferably arranged at substantially a right angle to the hook 14. A strip 16 is secured to each side board 6 and has connection with a chain 17, or like flexible element.

In Fig. 1, the hook 14 is shown as passed into a selected link of the chain 17. The end gate is thereby held in a more or less closed position, but will be free to partake of restricted movements. If it should be desired to clamp the end gate in the closed position, against rattling, the link receiving the hook 14 is drawn longitudinally of the hook and passed over the tightening shoulder 15, thereby drawing the end gate to the perpendicular position, in contact with the side boards 6, as shown in Figs. 2 and 3. The end gate is thereby firmly clamped against rattling movement.

It is to be understood that the form of my invention herewith shown and described is to be taken as a preferred embodiment of the same, and that various changes in the shape, size and arrangement of parts may be resorted to without departing from the spirit of my invention, or the scope of the subjoined claims.

Having thus described my invention, what I claim is:

1. A device for holding the end gate of a vehicle body in a closed position, comprising a fastening element to be secured to the end gate, said fastening element being provided at its free end with a hook and rearwardly of the hook with a tightening shoulder, said tightening shoulder being spaced a substantial distance from the forward portion of the hook, said hook serving as guide means to cause a link of a chain arranged upon the hook to be passed upon the shoulder, and a chain connected with the body of the vehicle and adapted to receive in a selected link thereof the hook of the fastening element, said link adapted to be shifted upon the tightening shoulder to hold the end gate against movement.

2. A device for holding the end gate of a vehicle body in a closed position, comprising a fastening element to be secured to the end gate, said fastening element being provided at its free end with a substantially vertical hook and rearwardly of the hook with a substantially horizontal tightening shoulder arranged at substantially a right angle to the hook, said tightening shoulder being spaced a substantial distance from the forward end of the hook, said hook serving as guide means to cause a link of a chain placed upon the hook to be passed upon the shoulder, and a chain connected with the body portion of the vehicle and adapted to receive in a selected link thereof the hook of the fastening element, said link being adapted to be shifted upon the tightening shoulder to hold the end gate against movement.

In testimony whereof I affix my signature in presence of two witnesses.

VIRGIL H. GARDNER.

Witnesses:
D. B. LEWIS,
A. L. COX.

Copies of this patent may be obtained for five cents each, by addressing the "Commissioner of Patents, Washington, D. C."